Figure 1:
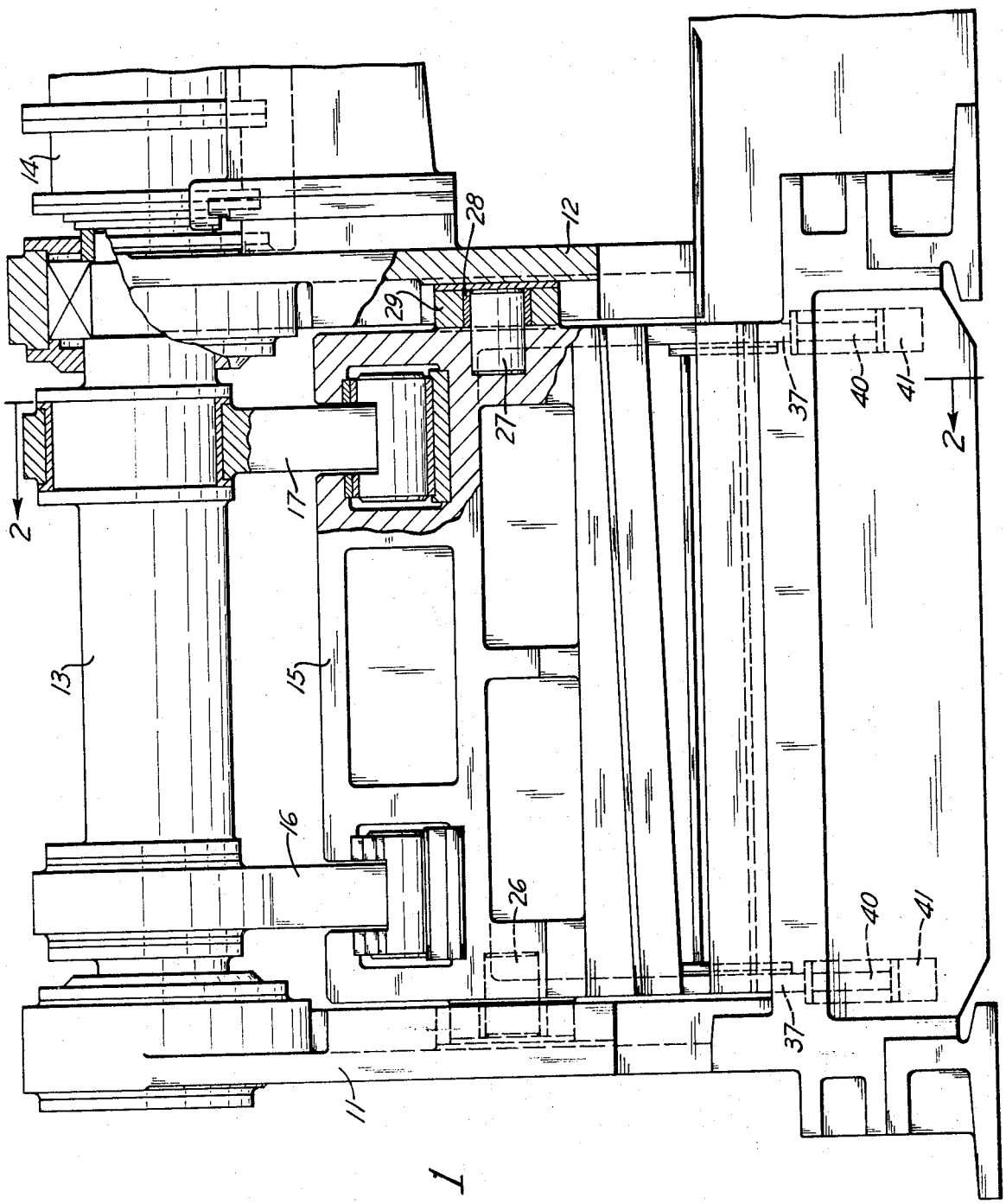

United States Patent [19]
Adair

[11] 3,788,181
[45] Jan. 29, 1974

[54] SHEAR
[75] Inventor: James R. Adair, Pittsburgh, Pa.
[73] Assignee: Wean United, Inc., Pittsburgh, Pa.
[22] Filed: Jan. 22, 1971
[21] Appl. No.: 108,843

[52] U.S. Cl.................. 83/554, 83/564, 83/628, 83/644
[51] Int. Cl.......................... B26d 5/08, B26d 5/16
[58] Field of Search..... 83/564, 554, 556, 644, 632, 83/633, 555, 628

[56] References Cited
UNITED STATES PATENTS

| | | | |
|---|---|---|---|
| 3,263,546 | 8/1966 | Musley | 83/556 |
| 2,351,868 | 6/1944 | Morgan | 83/564 X |
| 3,568,557 | 3/1971 | Hanni | 83/564 |
| 3,561,308 | 2/1971 | Ehrlich | 83/564 |

FOREIGN PATENTS OR APPLICATIONS

| | | | |
|---|---|---|---|
| 1,502,980 | 6/1969 | Germany | 83/564 |

*Primary Examiner*—Andrew R. Juhasz
*Assistant Examiner*—Leon Gilden
*Attorney, Agent, or Firm*—Henry C. Westin; Daniel Patch

[57] ABSTRACT

The disclosure of this invention relates to a shear for side trimming or dividing steel plates produced by a rolling mill. It illustrates and describes a stationary lower knife head to which there is secured a lower knife and a vertically movable upper knife head that support an upper knife. The upper knife head is connected to a crank shaft by pitmans and through which means the upper knife is moved towards and away from the lower knife to effect a cut. The path of the shearing and return stroke of the upper knife head is controlled so that during the cutting portion of the shearing stroke, the upper knife is caused to move perpendicular to the plate over the entire range of plate thicknesses adapted to be sheared, and immediately thereafter, at the commencement of the return stroke, the upper knife is displaced away from the sheared edge of the plate. This control is achieved by providing a pair of trunnions pivotally connected to the upper knife head in which the upper knife head is urged against a knife action control guiding surface during the shearing stroke and displaced laterally immediately after shearing and during the first portion of its return stroke in a manner that the lower portion of the head is tilted away from the sheared edge of the plate. A piston cylinder assembly connected to the upper knife head is employed to assist in the positioning of the head in timed sequence with the rotation of the crank.

10 Claims, 3 Drawing Figures

INVENTOR.
JAMES R. ADAIR
BY
Henry C. Westin
ATTORNEY.

SHEAR

While the features of the present invention can be employed in many different types of shears, for the purpose of describing the preferred form of the invention, reference will be made to its application to a plate side trimming shear employed in the steel industry to trim longitudinal marginal edges of plates after they have been rolled and cooled.

Because such plates range in thickness from 3/16" to 1½", past side trimming shears, which usually included separate opposed shears were, of necessity, constructed very heavily which made them extremely expensive. In addition, in recent past shears a mechanism was prepared to control the path of the movable knife so that during the cutting period of the shearing stroke an attempt was made to hold the knife perpendicular to the plate and immediately thereafter to displace it laterally away from the sheared edge. In this way a square sheared edge was sought and the movable knife was prevented from dragging against the sheared edge on its return stroke avoiding unnecessary knife wear, or damage and, of equal importance, delay in advancing the plate to position it for the next cutting operation. Examples of more recent designs of such plate shears are illustrated in the following U. S. Patents:

No. 3,263,546 that issued to H. Musly et al. on Aug. 2, 1966;

No. 3,359,845 that issued to K. Greis et al. on Dec. 26, 1967;

No. 3,440,914 that issued to Ernst-August Klein on Apr. 29, 1969; and

No. 3,469,483 that issued to D. Hobson et al. on Sept. 30, 1969.

The mechanisms proposed in these and other shears for controlling the path of the movable knife have been found to have several serious disadvantages. One, many of the mechanisms for controlling the knife path did not allow for a true perpendicular cut for the normal range of plate thicknesses. Second, the mechanisms, in general, were extremely expensive to manufacture and cumbersome in operation. In addition, the knife control mechanisms were very slow and did not allow for quick and convenient adjustment of the knives. As to the requirement that the plates be sheared with a truly perpendicular edge, the normal range of thicknesses of the plates being substantial, as noted previously, falls within 3/16" to 1½", past shears made it extremely difficult either to meet the requirement for the entire range or, if they did, they required very intricate and costly knife control mechanisms.

It is, therefore, the object of the present invention to provide a shear having an inexpensive, dependable and trouble-free control mechanism for the movable knife that will assure both a truly perpendicular cut over a wide range of thicknesses and quick and accurate displacement after cutting, so that the knife is prevented from contacting the sheared edge during the return stroke thereof.

It is a further object of the present invention to provide a shear having a crank shaft for displacing a movable knife toward and away from a stationary knife, said movable knife head being pivotally supported by a trunnion in a manner that the head can be urged against a knife action control guiding surface during the shearing stroke and displaced after shearing in a manner that the upper portion of the movable knife is moved in a forward direction while the lower portion is moved in a rearward direction with reference to the sheared edge of the material.

It is a still further object of the present invention to provide in a shear having a pair of frames and a movable and stationary knife head, each having a knife, a crank shaft supported by said frames for displacing the movable knife head, a pair of trunnions pivotally supporting said movable knife head, first guiding surfaces formed on said frames, said surfaces contained in planes arranged perpendicularly to the desired surface of the material to be sheared, means for connecting said pitmans to the inner side of said movable head, said trunnions arranged at the outer side of said movable knife head, sliding blocks rotatably receiving said trunnion means in a manner to allow said movable head to rotate about the axes of the trunnion means, guiding surfaces formed on said sliding blocks which surfaces extend parallel to and engage with said first guiding surfaces of said frames, second guiding surfaces formed on said frames, extensions formed on said movable knife head, guiding surfaces formed on said extensions adapted to engage siad second guiding surfaces of said frames, the second guiding surface of said frames being contained in planes parallel to the plane containing said first guiding surfaces of said frames, the relationship of the shearing and return strokes and the position of the crank shaft relative to the connection points of said pitmans and trunnion means to said movable knifehead being such that during the shearing stroke said guiding surfaces of said sliding blocks and extensions are urged into engagement with said first and second guiding surfaces of said frames, respectively, and during the return stroke said surface of said sliding blocks are urged away from said guiding surfaces of said frames, positive pressure means for urging said guiding surfaces of said blocks and extensions into engagement with the first and second guiding surfaces of said frames, respectively, during the shearing stroke of said shear and for separating them during the return stroke thereof, and stop means carried by said movable knife head spaced from said frames adapted to contact a different one of said frames on said positive pressure means separating said guiding surfaces during the return stroke.

Figure 2:
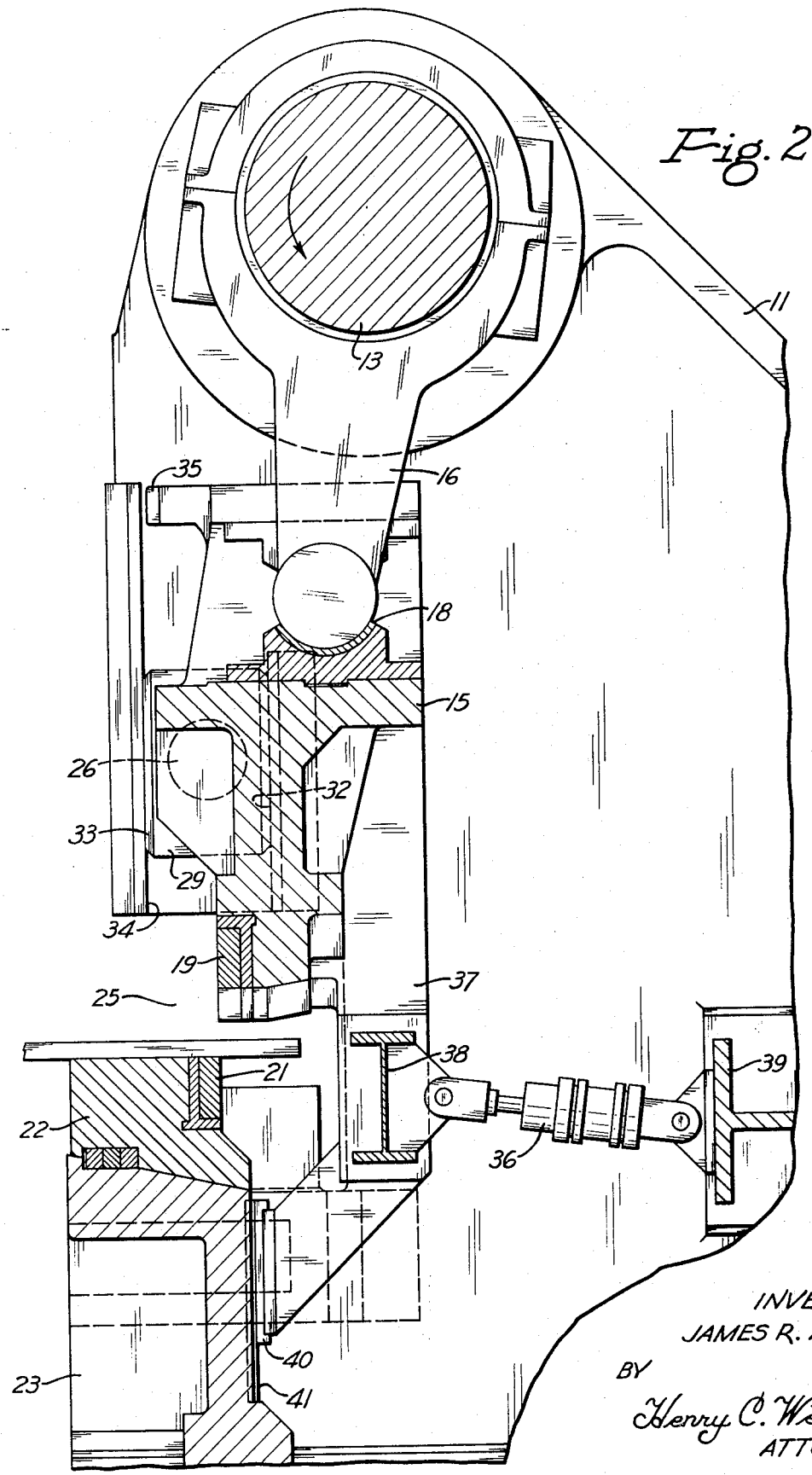
Figure 3:
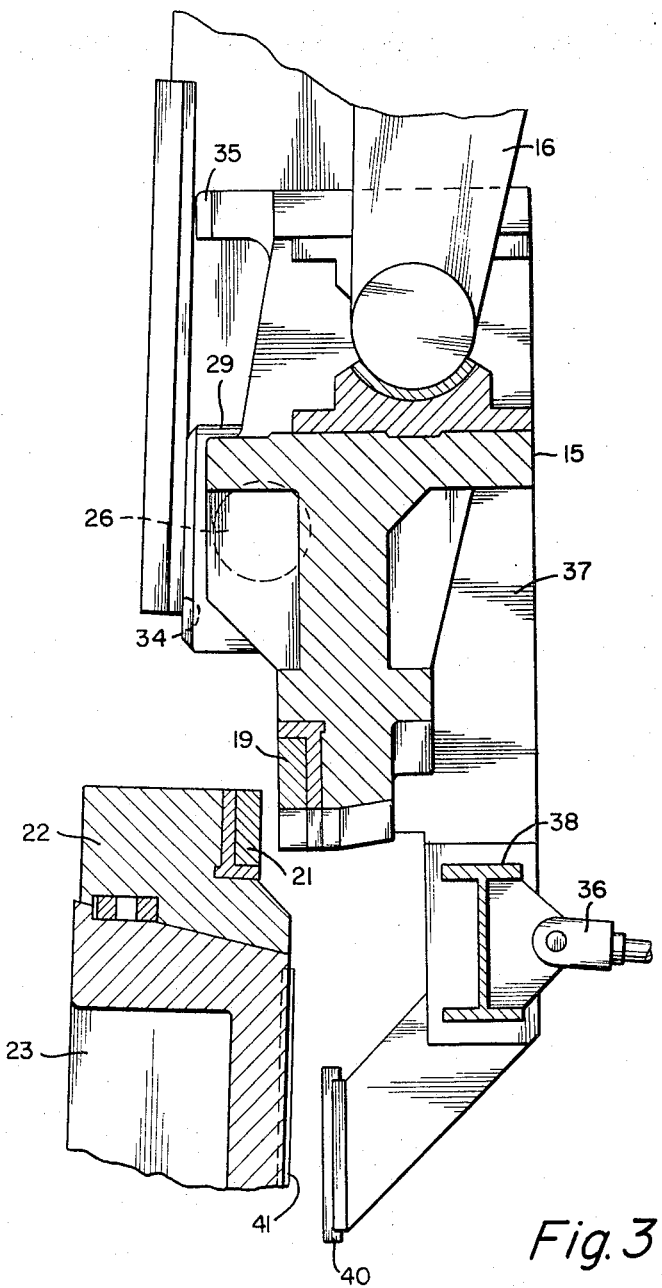

These objects as well as other novel features and advantages will be better appreciated when the following description is read along with accompanying drawings of which:

FIG. 1 is an elevational view, partly in section, of a side trimming plate shear incorporating the features of the present invention, FIG. 2 is a sectional view taken on lines 2 — 2 of FIG. 1 and illustrating the upper movable knife and associated parts in the position they assume at the beginning of the shearing stroke, and FIG. 3 is a sectional view similar to FIG. 2 but showing the top knife head in the position it assumes at the beginning of its upward stroke.

In referring first to FIG. 1, there is illustrated a plate side trimming shear made up of two identical upright housings 11 and 12, the upper portions of which rotatably support a crank shaft 13. The shaft is driven by an electrical drive, not shown, through a gear drive, not shown. The drive is connected to the crank shaft 13 by a coupling 14. Between the housings 11 and 12 there is arranged an upper knife head 15 which is connected to and vertically displaceable by the crank shaft 13 through downwardly extending pitmans 16 and 17. As best shown in FIG. 2, the pitmans are connected to the knife head 15 through bearings 18 which allow relative movement between the circular formed ends of the pitmans and the circular seats made up by the bearings 18 which are secured to the upper portion of the knife head 15.

To the lower portion of the knife head 15 is attached a knife 19 which has a vertical knife cutting surface and which, on displacement, is brought into a cooperative cutting relationship with a similar surface of a knife 21 which is secured to a stationarily mounted lower knife head 22. The knife head 22, shown best in FIG. 1, actually extends between the two housings 11 and 12 and is carried by the bed plate 23 of the shear. In referring to FIG. 2, it will be noted that the shear is provided with an opening 25 which receives the marginal edge of a plate fed in a longitudinal direction as one views the figure. Thus, the shear has an open side and a closed side, the closed side being at the back of the opening 25.

As previously noted, it is a feature of the present invention to so control the movement of the upper knife 19 and, more particularly, its supporting head 15, that during the shearing stroke, which is defined as the downward stroke of the head 15 and, still more particularly, the cutting portion of the shearing stroke, the knife 19 is held in an accurate perpendicular relationship with respect to the top surface of the plate, and that immediately after the completion of the cutting portion of the shearing stroke, the knife is displaced away from the shear edge so that it may be quickly returned without interference or contacting the sheared edge.

This objective, in the preferred embodiment of the present invention, is best illustrated in FIG. 1 where it will be seen that there are provided a pair of trunnions 26 and 27 arranged on the opposite sides of the upper knife head 15, having their inner end portions secured to the head and their outer end portions received in cylindrical bushings 28 carried by sliding blocks 29. The blocks 29 are slidably received at their closed ends in guideways 32 provided in each housing 11 and 12. At the open end of each block a bearing liner 33 is secured to the adjacent vertical side of the blocks which liner is adapted to be brought into engagement with a control guiding surface 34 formed on each shear housing. Since the guiding surfaces 33 and 34 along with two other similar surfaces, to be later described, control the position of the upper knife head 15 and, hence, the upper knife 19 during the shearing stroke, and particularly during the actual shearing portion of the shearing stroke, the surfaces are arranged perpendicular to the top of the material to be sheared and parallel to the desired vertical surface to be formed by the shearing operation.

The placement of the trunnions 26 and 27 relative to the connecting points of the pitmans 16 and 17 with the upper knife head 15 and the quadrant of rotation of the crank shaft 13 is an important consideration with respect to obtaining the desired controlled influence on the knife action of the upper knife 19. As shown in FIG. 2 the pitmans 16 and 17 on the down stroke of the crank shaft 13, depicted by the arrow superimposed thereon, under the influence of the reaction from the shearing force cause the upper knife head 15 to be urged into and maintained in contact with the guiding surfaces 34 of the housings 11 and 12. This urging continues until the end of the shearing stroke. At the beginning of the upward stroke of the crank shaft 13, as can be seen in FIG. 3, the upper knife head 15 is urged away from the guiding surfaces 34 causing the head 15 to pivot about the trunnions 26 and 27. In this action the upper portion of the head 15 moves towards the material to be sheared, as one views FIG. 2, while the lower portion and, particularly, the shearing edge of the upper knife 19 quickly rotates away from the sheared edge of the material. The rotational movement of the upper knife head 15 is controlled and assisted by spaced-apart stops 35 located at the top of the upper knife head that contacts the adjacent portions of the housings 11 and 12.

In order to always assure that the aforesaid knife action is obtained under even the most severe operating conditions, the urging action of the upper knife head 15 against the guiding surfaces 34 and the rotation immediately upon completion of the cut, a piston cylinder assembly 36 is connected at one end to a cross beam 38 connected to two extensions 37 of the upper knife head 15 and at the other end to a cross beam 39 arranged between the housings 11 and 12.

The extensions 37, as shown in FIG. 2, are provided with a guiding liner 40 that engage during the shearing stroke cooperative vertical guiding surfaces 41 provided on the lower knife head 22 arranged between the lower portions of the housings 11 and 12. These guiding surfaces are parallel to the guiding surfaces 33 and 34 and the guiding liner 40 is spaced from the guiding surface 41 a predetermined distance so that it engages the guiding surface 41 at the same time the surfaces 33 engage the surfaces 34 and remain in contact until the completion of the shearing stroke.

In accordance with the provisions of the patent statutes, I have explained the principle and operation of my invention and have illustrated and described what I consider to represent the best embodiment thereof.

I claim:

1. In a shear comprising:
   a frame,
   a crank shaft carried by said frame,
   a first knife head arranged in said frame on the side opposite said crank shaft,
   a first knife carried by said first knife head,
   a second knife head arranged in said frame on the same side as said crank shaft,
   a second knife carried by said second knife head,
   a pitman extending between and connected to said knife head and said crank shaft for displacing said second knife towards and away from a desired cutting plane formed by said knives,
   the improvement comprising:
   means for connecting said second knife head to said frame in a manner to allow said second knife to rotate in a first direction into said cutting plane during the shearing stroke and rotate in an opposite direction away from said cutting plane during the return stroke of said crank shaft, in order that during the cut said second knife is maintainable in said cutting plane and immediately thereafter is maintainable in a tilted plane relative to said cutting plane, a guiding surface on said frame arranged parallel to said desired cutting plane and adapted to be engaged by a guiding surface formed on said connecting means, in which the connecting point of said connecting means falls on the cutting plane side of a parallel plane passing through the axis of the crank shaft, whereby during the shearing stroke said guiding surfaces are urged into engagement and during the return stroke said guiding surfaces are urged away from each other, and a third guiding surface engagable by said second knife head constructed and arranged to control the extent of said rotation of said second knife head during the shearing stroke.

2. In a shear comprising:

a frame, a crank shaft carried by said frame, a first knife head arranged in said frame on the side opposite said crank shaft, a first knife carried by said first knife head, a second knife head arranged in said frame on the same side as said crank shaft, a second knife carried by said second knife head, a pitman extending between and connected to said second knife head and said crank shaft for displacing said second knife towards and away from a desired cutting plane formed by said knives, the improvement comprising:

means for connecting said second knife head to said frame in a manner to allow said second knife to rotate in a first direction into said cutting plane during the shearing stroke and rotate in an opposite direction away from said cutting plane during the return stroke of said crank shaft, in order that during the cut said second knife is maintainable in said desired cutting plane and immediately thereafter is maintainable in a tilted plane relative to said cutting plane, a guiding surface on said frame arranged parallel to said desired cutting plane and adapted to be engaged by a guiding surface formed on said connecting means, in which the connecting point of said connecting means falls on the cutting plane side of a parallel plane passing through the axis of the crank shaft, a third guiding surface engagable by said second knife head constructed and arranged to control the extent of said rotation of said second knife head during the shearing stroke, and means for urging said second knife head in a first direction so that said guiding surfaces will positively engage each other during the shearing stroke of said second knife head and in a second direction for causing said rotation of said second knife head for displacing said second knife head away from said cutting plane during the return stroke thereof.

3. In a shear according to claim 2 in which in said improvement said connecting means comprises trunnion means and a sliding block means wherein said trunnion means has a portion carried by said second knife head and a portion carried by said sliding block means, said guiding surface of said frame comprises two spaced-apart parallel guiding surfaces, and said guiding surface of said connecting means comprising guiding surfaces adapted to engage said two guiding surfaces of said frame.

4. In a shear according to claim 3 in which said trunnion means include two trunnions arranged on opposite sides of said second knife head, and said sliding block means include a sliding block for each of said trunnions, said trunnions being arranged forward of parallel planes continuing the cutting surfaces of said knives.

5. In a shear according to claim 3 in which the connecting points of said trunnion means and said pitman with respect to said second knife head are so arranged with respect to the shearing and return strokes that the connecting points of said trunnion means and said second knife head either fall on a plane passing relatively close to said desired cutting plane or to the side thereof overlying said first knife whereby the pitman is caused to urge the sliding block means against said guiding surfaces of said frame during the shearing stroke and away from said guiding surfaces during the return stroke.

6. In a shear according to claim 5 in which said trunnion means is arranged between the connecting point of said pitman with said second knife head and said second knife.

7. In a shear according to claim 2 wherein said frame has a side on which said crank shaft is mounted and wherein said frame has a side on which said crank shaft is maintained and wherein said guiding surface of said frame is arranged on the same side as said crank shaft, a second guiding surface formed on said frame arranged on the side of the frame opposite said crank shaft, and a second guiding surface formed on said second knife head arranged to engage said second guiding surface of said frame, said second guiding surfaces adapted to contact each other in a plane parallel to said first guiding surfaces and at the same time said first guiding surfaces contact each other.

8. In a shear according to claim 7 in which said third and fourth guiding surfaces are arranged on the side of the frame adjacent said first knife, and said means for urging said second knife head comprises a piston cylinder assembly.

9. In a shear according to claim 2 in which said improvement further comprises a stop means carried by said second knife head spaced from restraining means mounted on said frame during said shearing stroke and cause to contact said restraining means during said return stroke.

10. In a shear for severing material, such as metallic rolled plates and the like comprising:

a pair of upright frames constructed to have an open side and a closed side, a crank shaft extending between and rotatably carried by said frames, a movable knife head arranged between said frames, an upper knife carried by said movable knife head, a stationary knife head arranged between said frames, a lower knife carried by said stationary knife head adapted to cooperate with said upper knife to shear said material, a pair of pitmans connected to and extending between said movable knife head and said crank shaft adapted to displace said movable knife head in a generally vertical direction towards and away from a desired cutting plane formed by said knives, first guiding surfaces formed at the open side of said frames, said surfaces contained in planes arranged perpendicularly to a desired cutting plane, means for connecting said pitmans to the closed side of said movable head, sliding blocks carried by said second knife head, trunnion means arranged at the open side of said movable knife head in said sliding blocks in a manner to allow said movable head to rotate about the axes of the trunnion means in a first direction into said cutting plane during the shearing stroke and rotate in an opposite direction away from said cutting plane during the return stroke of said crank shaft in order that during the cut said second knife is maintainable in said desired cutting plane and immediately thereafter is maintainable in a tilted plane relative to said cutting plane, guiding surfaces formed on said sliding blocks which surfaces extend parallel to and engage with said guiding surfaces of said frames, in which said axes of said trunnion means fall on the cutting plane side of a parallel plane passing through the axes of the crank shaft whereby during the shearing stroke said guiding surfaces of said sliding blocks are urged into engagement with the guiding surfaces of said frames and during the return stroke said surfaces of said sliding blocks are urged away from said guiding surfaces of said frames, second guiding surfaces formed on said frames located below said stationary knife, an extension formed on said second knife head, guiding surfaces formed on said extension adapted to engage said guiding surfaces of said frames, the second guiding surfaces of said frames being contained in planes parallel to the plane containing said first guiding surfaces of said frames, positive pressure means for urging said guiding surfaces of said blocks and of said second knife head into engagement with a different one of the guiding surfaces of said frames during the shearing stroke of said shear and for separating them during the return stroke thereof, and a stop means carried by said second knife head spaced from each of said frames adapted to contact a different one of said frames on said positive pressure means separating said engaged guiding surfaces during the return stroke.

* * * * *